(No Model.)
P. HEINTZ.
SUBSOIL PLOW.
No. 546,884. Patented Sept. 24, 1895.
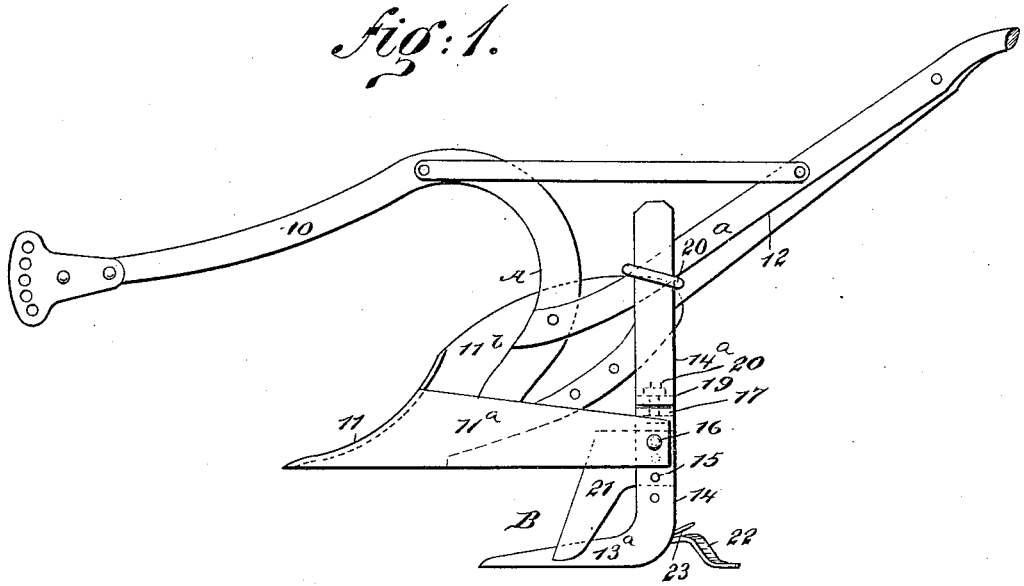
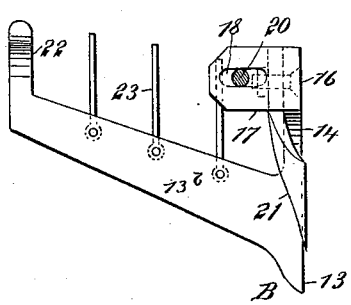
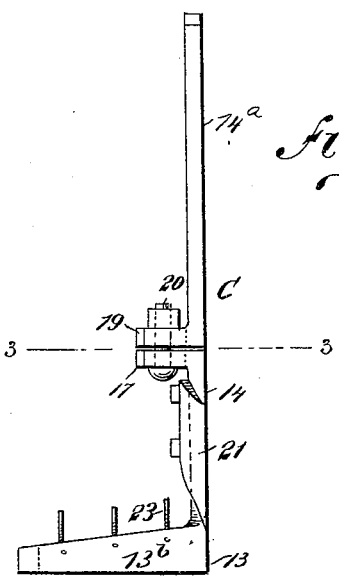
WITNESSES:
Chas. Nida
J. Fred. Acker
INVENTOR
P. Heintz
BY
Munn & Co.
ATTORNEYS.
ANDREW B. GRAHAM. PHOTO-LITHO. WASHINGTON, D.C.

UNITED STATES PATENT OFFICE.

PETER HEINTZ, OF GRAND ISLAND, NEBRASKA.

SUBSOIL-PLOW.

SPECIFICATION forming part of Letters Patent No. 546,884, dated September 24, 1895.

Application filed December 22, 1894. Serial No. 532,632. (No model.)

*To all whom it may concern:*

Be it known that I, PETER HEINTZ, of Grand Island, in the county of Hall and State of Nebraska, have invented a new and useful Improvement in Subsoil-Plows, of which the following is a full, clear, and exact description.

My invention relates to an improvement in subsoil-plows; and it has for its object to provide a subsoil attachment comprising a share and an adjustable shank, together with a shoe connected with the moldboard of the share to prevent springing of the latter, and breakers likewise attached to the moldboard for pulverizing the soil, together with a cutter located at the front of the shank and extending down to the landside for the purpose of breaking the ground as the plow penetrates it.

Another object of the the invention is to so construct the entire attachment that it may be applied to any plow no matter what the shape may be, since when the share has been connected with the main share of the plow in a manner to cause the landside and moldboard of the two plows to coincide the upper section of the shank may be adjusted to accommodate itself to any shape or position of handle, standard, or other support to which attachment is to be made, the subsoil attachment being so attached to the main plow as to be held in fixed and firm position.

Another object of the invention is to so construct the subsoil attachment that it will not interfere with depressing or raising the main plow during the operation of plowing.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in all the views.

Figure 1 is a side elevation of a plow having the subsoil attachment applied thereto. Fig. 2 is a front elevation of the attachment, and Fig. 3 is a horizontal section taken substantially on the line 3 3 of Fig. 2.

In carrying out the invention the plow A shown may be of any ordinary construction, and comprises a beam 10, a share 11, including landside $11^a$ and moldboard $11^b$, and handles 12. The subsoil attachment comprises a plow B, said plow comprising a share 13, a landside $13^a$, and a moldboard $13^b$, the said plow B being of considerably-less size than that of the main plow, and in addition to the said plow the attachment consists of an adjustable shank C, comprising two members 14 and $14^a$, the lower member 14 being decidedly curved or rendered substantially L-shaped at the bottom, where it is either made to connect with the landside of the subsoil-plow B or constitutes an integral portion thereof, and this lower section of the shank is provided with apertures 15, since the vertical or upper portion of the shank portion 14 is to be brought in engagement with the inner face of the landside $11^a$ of the main plow, as shown in Fig. 1, and is adjustably attached thereto by means of a bolt 16, passed through one of the apertures 15 and through the main landside. In this manner the depth that the attachment shall travel in the ground may be readily controlled, and when the attachment is so connected with the main plow the landside of the subsoil and its moldboard will substantially coincide with the corresponding parts of the main plow, likewise the share proper.

At the top of the lower section 14 of the subsoil-shank a flange 17 is formed at a right angle to the upright portion of the said section, as shown in Fig. 2, and in this flange 17 an elongated slot or opening 18 is made, as illustrated in Fig. 3. The upper shank-section $14^a$ is provided at its lower end with a flange 19, corresponding to the flange 17 of the lower section and adapted for engagement therewith, and the two flanges are adjustably connected by a bolt 20, which passes through the elongated aperture or opening 18 in the lower flange. Under this construction it will be observed that no matter what the shape or position of the handles of the main plow may be, or whatever support may be selected to which to attach the shank, the said upper shank-section may be adjusted upon the lower section to accommodate itself to such position without in the slightest degree throwing the subsoil-plow out of position or straining its lower fastening device. A clip or clevis $20^a$ is usually employed to attach the upper shank-section to the handle 12 of the plow or other support. A cutter 21 is preferably adjustably attached to the inner face of the lower shank-section 14, and the said cutter extends downward in front of the said shank-section in a forwardly direction, preferably to the landside of the subsoil-plow.

At the extreme outer end of the moldboard-section of the subsoil-plow a shoe 22 is either attached to or formed integral therewith, and the said shoe extends rearwardly from the rear edge of the said moldboard-section, and is then carried downward and horizontally rearward, as shown in Fig. 1, the said shoe serving to keep the moldboard from springing or bending down when the subsoil-plow is made to enter hard ground.

The subsoil attachment is completed, preferably, by the addition of a series of fingers or bars 23, projected from the rear edge of the moldboard-section at desired intervals apart. These fingers or bars are designed to break up the earth, and are usually bolted to the under face of the said moldboard-section, and are then carried upward level with its upper face, and from thence in a rearwardly direction.

It will be observed that since the lower end of the shank of the subsoil-plow is L-shaped or curved it will serve as a rocker for the plow proper and enables the plowman to depress or elevate the point of the plow as may be found necessary during the act of plowing.

Having thus described my invention, I claim as new and desire to secure by Letters Patent—

In a plow, the combination of a beam, a share secured thereto and having a landside, a subsoil attachment comprising a share having a landside, and a shank for said attachment comprising two sections pivoted together and adapted to turn one on the other in a horizontal plane, the upper section being adapted to be secured to the plow beam and the lower section being connected at its lower end to the subsoil attachment and being connected to and vertically adjustable on the landside of the plow share at its upper end, substantially as set forth.

PETER HEINTZ.

Witnesses:
J. E. DILL,
S. C. HUSTON.